(12) United States Patent
Larmande

(10) Patent No.: US 6,698,733 B1
(45) Date of Patent: Mar. 2, 2004

(54) HYDRAULIC ANTIVIBRATION SUPPORT

(75) Inventor: Franck Larmande, Grand Rapids, MI (US)

(73) Assignee: Paulstra CRC, Grand Rapids, MI (US)

( * ) Notice: Subject to any disclaimer, the term of this patent is extended or adjusted under 35 U.S.C. 154(b) by 0 days.

(21) Appl. No.: 10/335,293

(22) Filed: Dec. 30, 2002

(51) Int. Cl.$^7$ ............................................... B60G 11/22
(52) U.S. Cl. .................................... 267/293; 267/140.5
(58) Field of Search ............................... 267/293–294, 267/140.13, 140.5; 248/562, 636

(56) References Cited

U.S. PATENT DOCUMENTS 2,273,869 A * 2/1942 Julien ........................ 267/153
5,547,172 A   8/1996 Corcoran
6,386,529 B2 * 5/2002 Bik et al. .................... 267/293

* cited by examiner

Primary Examiner—Jack Lavinder
Assistant Examiner—Xuan Lan Nguyen
(74) Attorney, Agent, or Firm—Marshall, Gerstein & Borun LLP

(57) ABSTRACT

A hydraulic antivibration support including a first rigid connection device having a base and a vertical pin, a second rigid connection device having a rigid vertical tube, a first elastomer body connecting the base to the second connection device and able to support a permanent weight, a second elastomer body fitted inside the tube. The second elastomer body has two deformable walls, on both sides of a free passage traversed by the pin, defining two hydraulic chambers connected together by a throttled channel.

9 Claims, 4 Drawing Sheets

HYDRAULIC ANTIVIBRATION SUPPORT

FIELD OF THE INVENTION

The invention relates to hydraulic antivibration supports.

BACKGROUND OF THE INVENTION

More precisely, the invention relates to a hydraulic antivibration support adapted to be interposed between first and second rigid elements undergoing a relative vibratory motion at least vertically and parallel to a substantially horizontal first axis, for supporting one of the first and second rigid elements and for damping said vibratory motions along said first axis.

Such hydraulic antivibration supports are known in the art.

For instance, as shown in FIG. 1 of the drawings, one known antivibration support 1 of this type, which is designed to connect a first rigid element 2 such as a vehicle body to a second rigid element 3 such as a vehicle engine, includes a supporting device 4 having first and second connection members 5, 6 which are respectively fixed to the first and second rigid elements 2, 3.

The first and second connection members 5, 6 are connected together by an elastomer body 7 having two thick arms 7a, 7b able to withstand part of the weight of the second rigid element 3.

The elastomer body 7 enables relative movements between the first and second rigid elements 2, 3 parallel to first and second horizontal axes X, Y and parallel to a vertical axis Z.

Further, in order to damp the relative movements between the first and second rigid elements 2, 3 parallel to the first horizontal axis X, the antivibration support 1 further includes a damping device 8, which can be seen in more details in FIG. 2.

The damping device 8 includes a rigid ring of metal 9 which may be fixed for instance to the first rigid element 2 through a bracket 10 and which may be fixed by crimping to a rigid cover 11, itself fixed to a stud 12. The stud 12 may be itself fixed to the first rigid element 2 and possibly to a U shaped guide member 13 (FIG. 1).

Further, the damping device 8 includes a rigid plate 14 (FIG. 2) which is extended, opposite to the cover 11, by a rod 15 parallel to axis X, said rod being slidingly mounted in guide 13 and connected, for instance through an antivibration sleeve 15a, to a bracket 3a which is fixed to the second rigid element 3.

The plate is overmolded by an elastomer membrane 16 which is also overmolded on the ring 9. An other elastomer membrane 16a is fixed to the ring 9 inside the cover 11, and the inner space between the two membranes 16, 16a is separated into two chambers 17, 18 by a rigid partition 19 including a decoupling membrane 20 and a throttled channel 21 in communication with the two chambers 17, 18, said chambers 17, 18 and said channel 21 being filled with a liquid.

This known antivibration support has the drawbacks of being expensive and bulky.

A second known antivibration device 30 of the type in question is shown in FIG. 3.

This second antivibration device of the prior art includes a first rigid strength member 31 which is fixed to an outer rigid tube 32 and which is designed to be fixed to the first rigid element 2 as described above.

The antivibration support 30 also includes a second rigid strength member 33 which may extend longitudinally parallel to axis Y and which is designed to be fixed to the second rigid element 3 as described above.

An elastomer body 34 is fitted inside the tube 32 and includes two thick arms 35 converging upward toward the second strength member 33 so as to be able to withstand at least part of the weight of the second rigid element 3. The elastomer body further includes two deformable walls 36 delimiting two hydraulic chambers 37, 38 with the tube 32. These hydraulic chambers 37, 38 are filled with liquid and communicate together through a throttled channel 39.

Thus, when the first and second rigid elements 2, 3 undergo relative horizontal movements parallel to axis X, the second rigid strength member 33 presses alternately the deformable walls 36 of the two chambers 37, 38, thus provoking transfers of liquid between the two chambers, which damps said horizontal movements.

The antivibration support of FIG. 3 has also the drawbacks of being expensive and rather bulky, specially in the vertical direction.

OBJECTS AND SUMMARY OF THE INVENTION

One objective of the present invention is to remedy these drawbacks, for a cost as limited as possible.

To this end, according to the invention, a hydraulic antivibration apparatus of the type in question includes:

- a first rigid connection device adapted to be fixed to the first rigid element, said first connection device including a base and a substantially vertical pin extending from the base,
- a second rigid connection device adapted to be fixed to the second rigid element, said second connection device including a rigid tube having a substantially vertical central axis,
- a first elastomer body connecting the base of the first connection device to the second connection device, said first elastomer body being adapted for supporting one of the first and second rigid elements,
- a second elastomer body which is disposed inside said rigid tube and which defines therewith at least two deformable hydraulic chambers filled with liquid and connected together by a throttled channel, said second elastomer body including at least two deformable walls which partially define the hydraulic chambers and which are substantially aligned parallel to said first axis so as to be deformed by the pin during relative movements of the first and second connection devices parallel to said first axis, said pin extending in a substantially vertical free passage defined between said deformable walls, and said second elastomer body being free to move vertically relative to said pin without substantially being deformed.

Thanks to these dispositions, the antivibration support is compact and, since the supporting and damping functions are carried out by two separate elastomer bodies, the shapes and mounting of these bodies is rather simple, so that the support can be manufactured at a reasonable cost.

In various embodiments of the invention, one may possibly have recourse in addition to one and/or other of the following arrangements:

- each of said deformable walls includes an inner portion which is in close proximity to the pin, and which is free to move vertically relative to said pin;

said pin is disposed in said free passage with a larger play parallel to a substantially horizontal second axis than parallel to the first axis, said second axis being perpendicular to the first axis;

the second elastomer body includes two lateral elastomer bosses which are adapted to be abutted by the pin parallel to the second axis for limiting relative movements of the first and second connection devices parallel to said second axis;

the second connection device further includes a first rigid strength member on which the first elastomer body is molded, and a second rigid strength member which is fixed to said tube;

said tube is fitted in the second strength member of the second connection device;

the first strength member of the second connection device includes a central hole delimited by a horizontal annular flange which is in vertical abutment with said rigid tube in the direction of the base, and said first strength member of the second connection device further includes a tubular portion of substantially vertical axis surrounding said flange, said rigid tube being fitted in said tubular portion;

said first elastomer body includes a lower elastomer boss adapted to cooperate with said flange to limit a relative vertical movement of the first and second connection devices toward one another;

the second elastomer body includes at least a vertical boss which protrudes opposite of the base and which is adapted to cooperate by abutment with a transverse rigid member fixed to the pin, for limiting vertical relative movement of the first and second connection devices apart from one another.

BRIEF DESCRIPTION OF THE DRAWINGS

Other characteristics and advantage of the invention appear from the following detailed description of one of its embodiments, given by way of non-limiting example, and with reference to the accompanying drawings.

In the drawings:

In the figures, the same references denote identical or similar elements.

As shown in FIGS. 4–7 of the drawings, the invention concerns a hydraulic antivibration support 100 which is adapted to be interposed between first and second rigid elements 101, 102 (FIG. 5) undergoing a relative vibratory motion along a substantially vertical axis Z, along a substantially horizontal first axis X and along a substantially horizontal second axis Y.

The first rigid element 101 may for instance belong to the body or frame of a vehicle such as an automobile, whereas the second rigid element 102 may for instance belong to the powertrain of the vehicle (for instance, the vehicle engine).

The antivibration support 100 includes a first rigid connection device 103 which is adapted to be fixed to the first rigid element 101.

Figure 1:
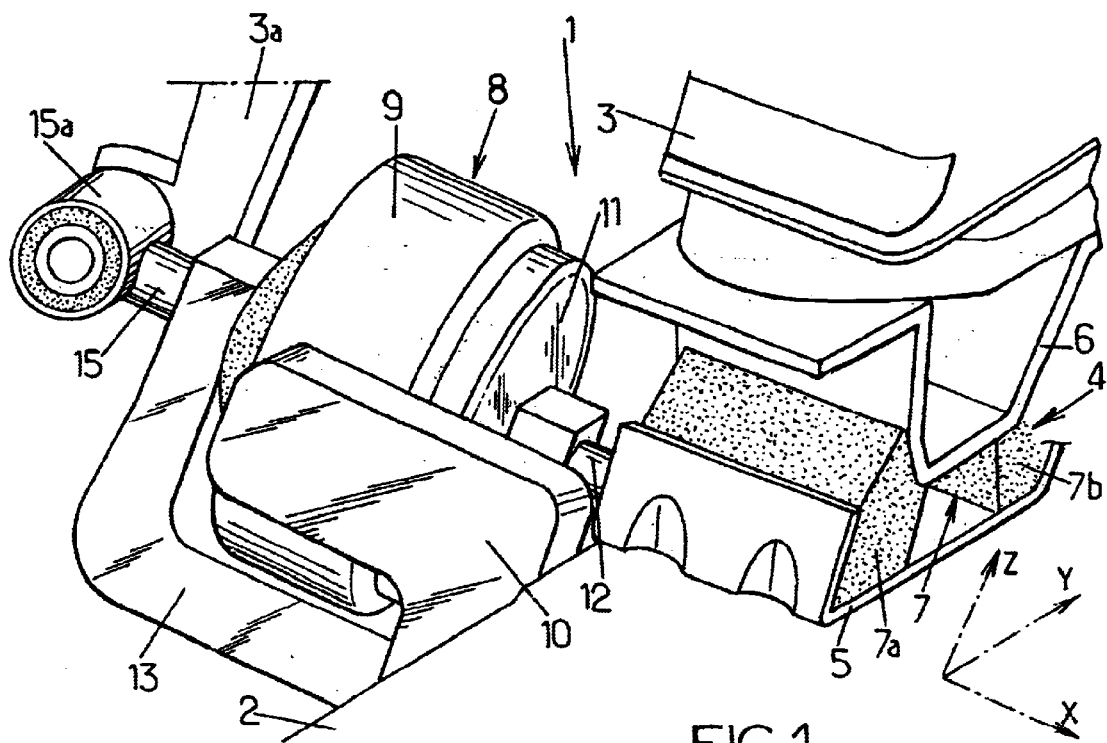
FIG. 1 is a perspective view illustrating a first antivibration support of the prior art.
Figure 2:
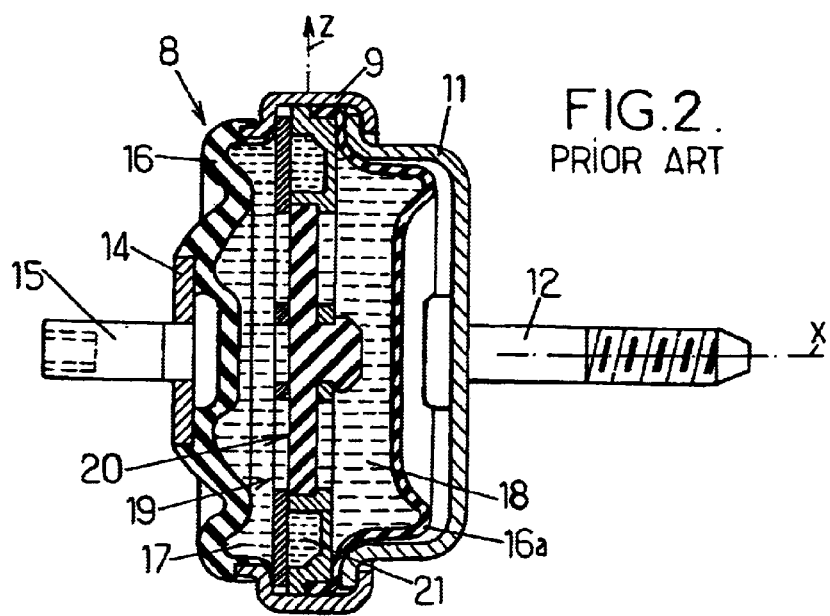
FIG. 2 is a section view of a portion of the antivibration support of FIG. 1.
Figure 3:
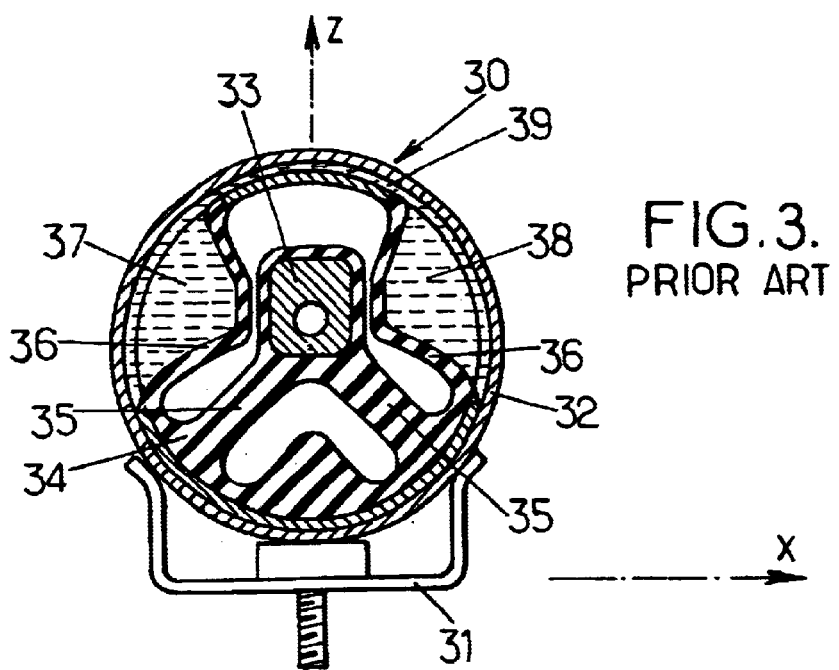
FIG. 3 is a section view of a second antivibration support of the prior art.
Figure 4:
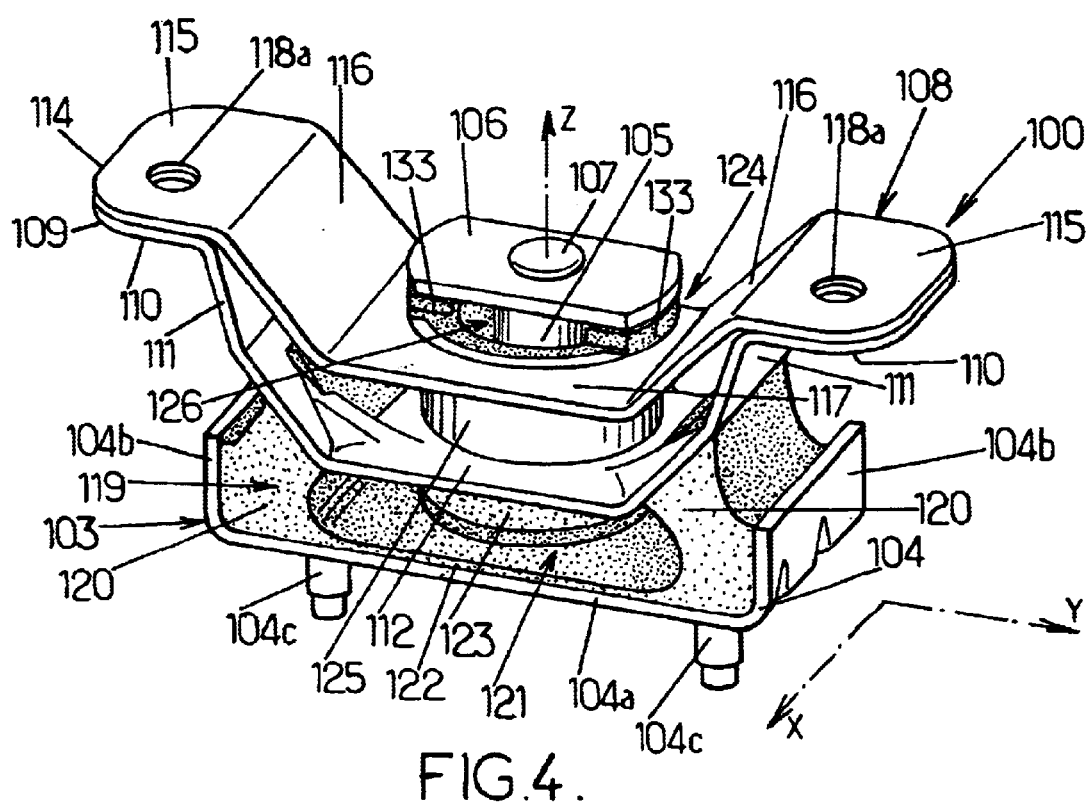
FIG. 4 is a perspective of an antivibration support according to one embodiment of the invention.
Figure 5:
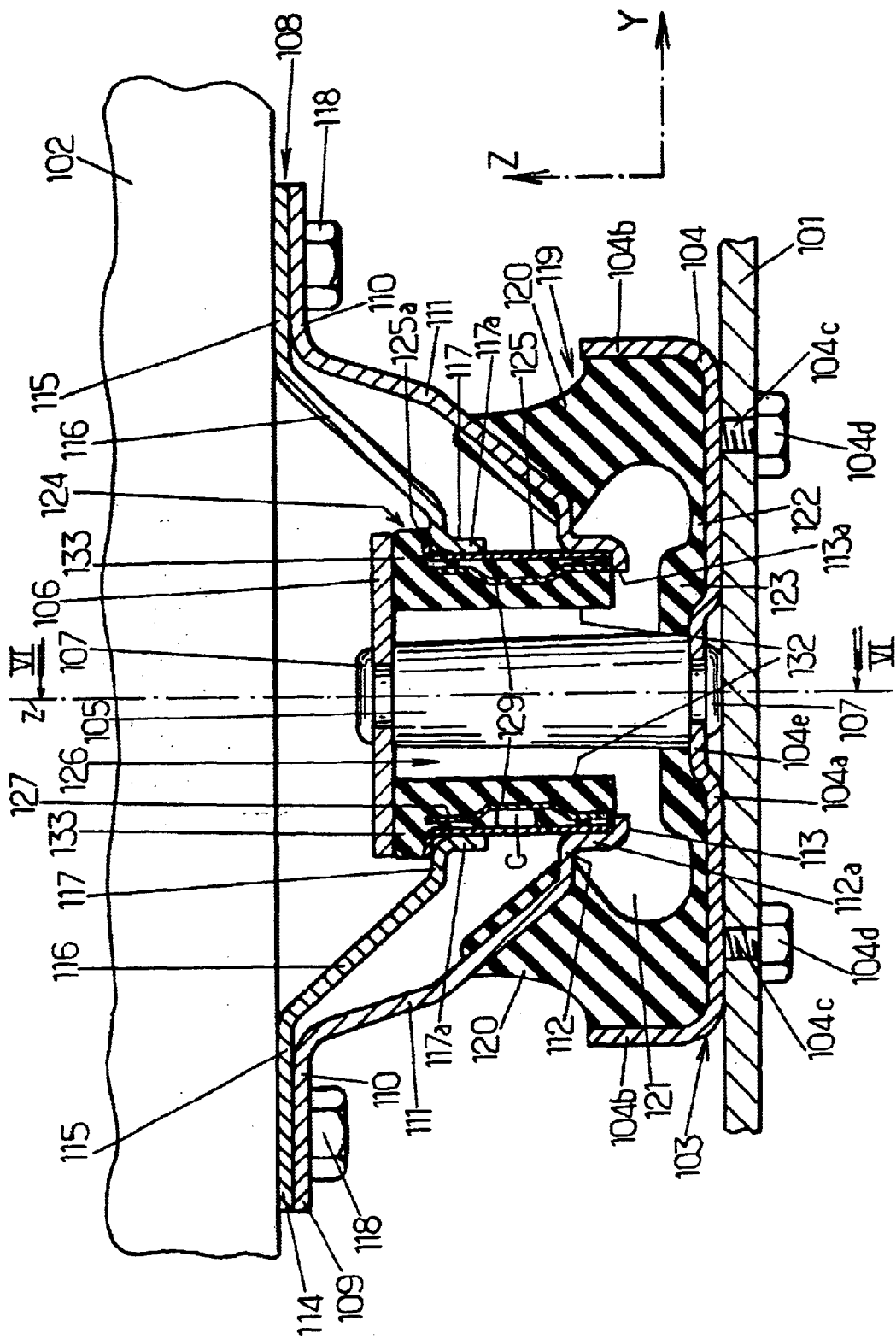
FIG. 5 is a vertical section view of the antivibration support of FIG. 4, taken along line V—V of FIG. 6.

The first rigid connection device 103 itself includes (see FIGS. 4 and 5):

a rigid base 104, which may for instance be constituted by a metal plate (made e.g. out of steel) including a substantially horizontal flat portion 104a extending longitudinally parallel to the second axis Y between two folded ends 104b which extend substantially vertically upward; in the example shown in the drawings, said flat portion 104a may further include studs 104c or similar connecting members which extend vertically downward and which are adapted to fix the base 104 to the first rigid element 101 by means of nuts 104d or similar elements;

and a substantially vertical rigid pin 105, for instance made out of steel, which extend upward along axis Z from a central part of the flat portion 104a.

The lower end of the pin 105 may be fixed for instance to a raised central pressing 104e of the flat portion 104a of the base, for instance by a crimping 107 made at the lower end of the pin, or by screwing, welding etc.

Besides, the upper end of the pin 105 may further be connected to a transverse rigid member 106, for instance a flat horizontal plate which can be made e.g. out of steel. The rigid transverse member 106 may extend longitudinally for instance parallel to axis Y, and may be fixed to the pin 105 for instance by a crimping 107 of the said upper end thereof, or by screwing, welding, etc.

The antivibration support 100 further includes a second rigid connection device 108 which is adapted to be fixed to the second rigid element 102, and which is disposed over the first connection device in the example shown in the drawings. The second connection device could however be disposed under the first connection device in other embodiments (not shown).

Said second connection device 108 itself includes a first rigid strength member 109, a second rigid strength member 114 and a rigid tube 125 centered on axis Z.

The first rigid strength member 109 may be constituted for instance by a deep-drawn metal plate, made e.g. out of steel, including for instance two horizontal tabs 110 which are aligned parallel to axis Y and which are respectively extended toward one another and downwards by two sloping portions 111 converging toward a substantially horizontal flat portion 112.

The flat portion 112 has a central deep-drawn tubular portion 112a centered on axis Z, and said tubular portion 112a is extended radially inwardly, at its lower end, by a flange 113 delimiting a central hole 113a.

The second strength member 114 may also be constituted by a deep-drawn metal plate, made e.g. out of steel, which includes two tabs 115 superposed respectively on the tabs 110 of the first rigid strength member 109.

The tabs 115 are extended, one toward the other and downward, respectively by two sloping portions 116 which converge toward a horizontal flat portion 117 situated above said flat portion 112. The flat portion 117 has a deep-drawn tubular portion 117a which is centered on axis Z and which has the same diameter as said tubular, portion 112a.

The superposed tabs 110, 115 of the first and second rigid strength members may be connected to the second rigid element 102 for instance by screws 118 (FIG. 5) which go through holes 118a (FIG. 4) provided in said tabs 110, 115.

The rigid tube 125, which may be made for instance out of steel, may be tightly fitted in the tubular portions 112a, 117a of the first and second rigid strength members, the lower end of said tube 125 bearing vertically in abutment against the flange 113. The upper end of the tube 125 may further include a radially outwardly extending collar 125a which bears on the flat portion 117a of the second rigid strength member.

The first connection device 103 is linked to the second connection device 108 by a first elastomer body 119 (FIGS. 4 and 5) which is overmolded and bonded to said first and second connection devices. In the example shown in the drawings, the first elastomer body 119 includes two thick arms 120 of elastomer which converge upward and one toward the other parallel to axes Y, Z, and which are able to withstand at least part of the weight of the second rigid element 102. Thus, the first elastomer body 119 leaves an open space 121 between the two arms 120.

Each arm 120 extends from a lower end which is overmolded and bonded to one end 104b and to the adjacent part of the flat portion 104a of the base 104, up to an upper end which is overmolded and bonded to the corresponding sloping portion 111 of the first rigid strength member 109.

Further, in the example shown in the drawings, the first elastomer body 119 also includes a layer of elastomer 122 which coats the upper face of the flat portion 104a of the base between the two arms 120. This layer 122 may form a lower elastomer boss 123 protruding upward in correspondence with the pressing 104e, said lower boss 123 being able to cooperate by vertical abutment with the collar 113 for limiting relative vertical movements of the first and second rigid elements 101, 102 one toward the other.

Besides, the antivibration support 100 further includes a second elastomer body 124 which is fitted inside said tube 125 and which defines a vertical free passage 126 in which extends the pin 105.

Figure 6:
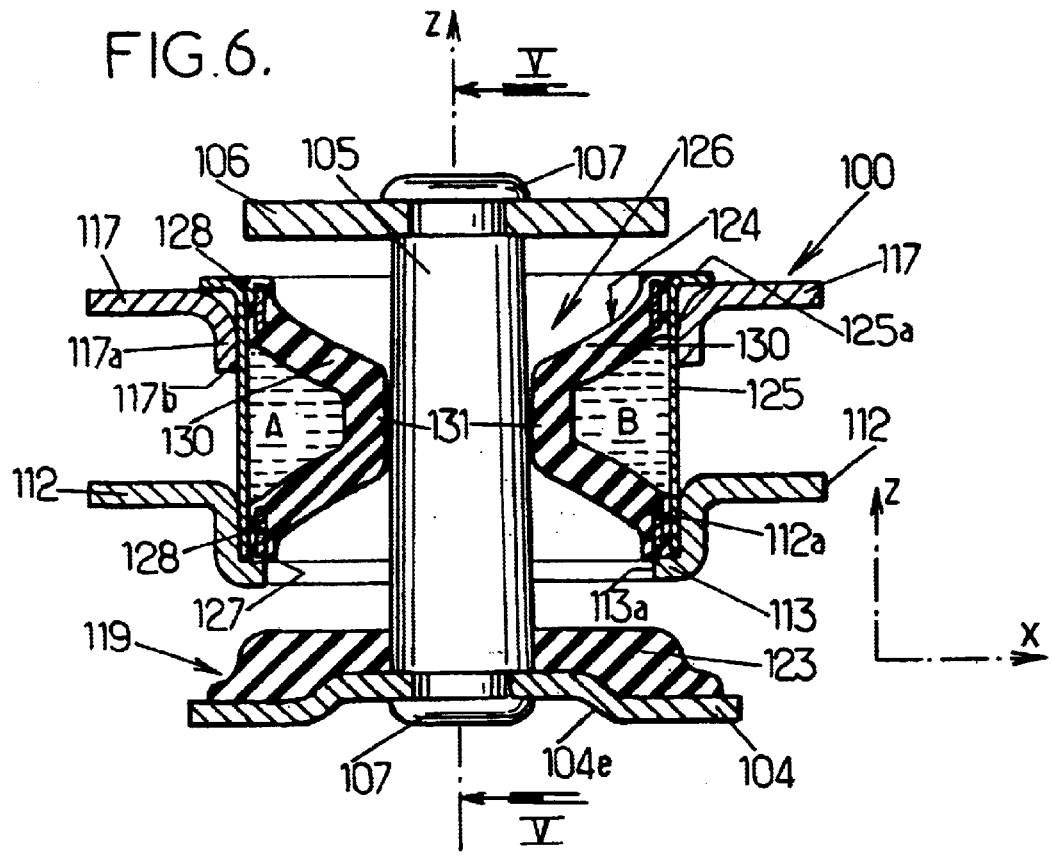
FIG. 6 is a section view of the support of FIG. 5, taken along the line VI—VI of FIG. 5.
Figure 7:
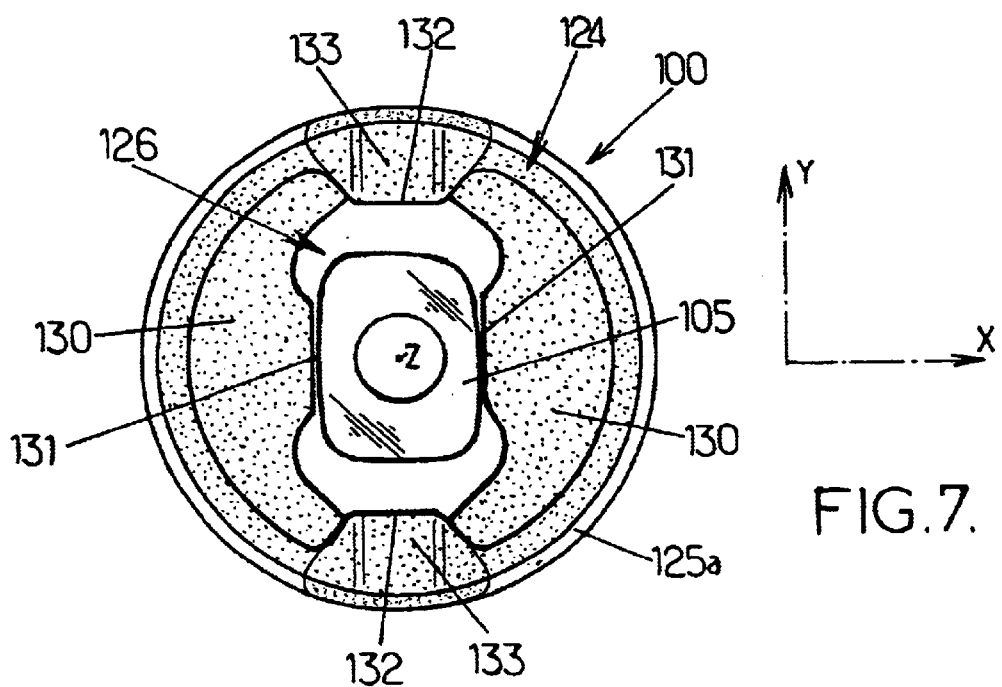
FIG. 7 is a top view of part of the support of FIG. 4.

The second elastomer body is preferably overmolded on a reinforcing steel cage 127 which may include for instance two horizontal rings 128 (FIG. 5) situated respectively near the axial ends of the tube 125 and which are connected together by two vertical connecting arms 129 (FIG. 6) aligned parallel to axis Y.

The second elastomer body 124 includes two deformable walls 130 which are aligned parallel to axis X and which form two pouches opening radially outwardly. Each of said deformable walls 130 extends radially inwardly up to an inner portion 131 which is in close proximity to the pin 105 but which is not bonded to the pin, so as to enable a vertical sliding movement of the pin relative to the second elastomer body 124 without substantial deformation of the deformable walls 130.

Since the rigid tube 125 is fitted in tight contact outside the second elastomer body 124, said deformable walls 130 define with the tube 125 two tight hydraulic chamber A, B (FIG. 6) which are filled with liquid and which are connected together through a throttled channel C (FIG. 5) itself filled with liquid. Thus, when the first and second rigid elements 101, 102 are submitted to relative horizontal movements parallel to the first axis X, said movements are damped by the transfer of liquid between the two chambers A, B through the throttled channel C.

The second elastomer body further forms two lateral bosses 132 which protrude radially inwardly in the free passage 126 and which are aligned parallel to axis Y. These lateral bosses 132 are adapted to cooperate with the pin 105 by lateral abutment, in order to limit the relative movements of the first and second rigid elements 101, 102 horizontally parallel to axis Y.

In the example shown in the drawings, the free passage 126 has an elongated cross section which extends longitudinally parallel to axis Y and the pin 105 has itself a substantially rectangular cross section with rounded angles, the cross section of the pin 105 extending longitudinally also parallel to axis Y. Also, in the example shown in the drawings, the free passage 126 leaves more play between the pin 105 and the second elastomer body 124 parallel to axis Y than parallel to axis X.

Finally, the second elastomer body 124 also includes two vertical bosses 133 which extend respectively the two lateral bosses 132 upward and which are in vertical abutments with the transverse rigid member 106 for limiting the vertical relative movements of the first and second rigid elements 101, 102 away from one another.

Thanks to these dispositions, the function of supporting the second rigid elements 102 and the function of damping the horizontal movements parallel to axis X are carried out separately, respectively by the first and second elastomer bodies. Due to this separation of functions, the antivibration support has a rather low cost of manufacture.

Further, the antivibration support 100 is very compact, specially in the vertical direction.

Finally, it should be noted that the second elastomer body never works in traction, which a positive impact on its lifetime.

I claim:

1. A hydraulic antivibration support adapted to be interposed between first and second rigid elements undergoing a relative vibratory motion at least vertically and parallel to a substantially horizontal first axis, said antivibration support including:
   a first rigid connection device adapted to be fixed to the first rigid element, said first connection device including a base and a substantially vertical pin extending from the base,
   a second rigid connection device adapted to be fixed to the second rigid element, said second connection device including a rigid tube having a substantially vertical central axis,
   a first elastomer body connecting the base of the first connection device to the second connection device, said first elastomer body being adapted for supporting one of the first and second rigid elements,
   a second elastomer body which is disposed inside said rigid tube and which defines therewith at least two deformable hydraulic chambers filled with liquid and connected together by a throttled channel, said second elastomer body including at least two deformable walls which partially define the hydraulic chambers and which are substantially aligned parallel to said first axis so as to be deformed by the pin during relative movements of the first and second connection devices parallel to said first axis, said pin extending in a substantially vertical free passage defined between said deformable walls, and said second elastomer body being free to move vertically relative to said pin without substantially being deformed.

2. A hydraulic antivibration support as claimed in claim 1, wherein each of said deformable walls includes an inner portion which is in close proximity to the pin, and which is free to move vertically relative to said pin.

3. A hydraulic antivibration support as claimed in claim 2, wherein said pin is disposed in said free passage with a larger play parallel to a substantially horizontal second axis than parallel to the first axis, said second axis being perpendicular to the first axis.

4. A hydraulic antivibration support as claimed in claim 3, wherein the second elastomer body includes two lateral elastomer bosses which are adapted to be abutted by the pin parallel to the second axis for limiting relative movements of the first and second connection devices parallel to said second axis.

5. A hydraulic antivibration support as claimed in claim 1, wherein the second connection device further includes a first rigid strength member on which the first elastomer body is molded, and a second rigid strength member which is fixed to said tube.

6. A hydraulic antivibration support as claimed in claim 5, wherein said tube is fitted in the second strength member of the second connection device.

7. A hydraulic antivibration support as claimed in claim 6, wherein the first strength member of the second connection device includes a central hole delimited by a horizontal annular flange which is in vertical abutment with said rigid tube in the direction of the base, and said first strength member of the second connection device further includes a tubular portion of substantially vertical axis surrounding said flange, said rigid tube being fitted in said tubular portion.

8. A hydraulic antivibration support as claimed in claim 7, wherein said first elastomer body includes a lower elastomer boss adapted to cooperate with said flange to limit a relative vertical movement of the first and second connection devices toward one another.

9. A hydraulic antivibration support as claimed in claim 1, wherein the second elastomer body includes at least a vertical boss which protrudes opposite of the base and which is adapted to cooperate by abutment with a transverse rigid member fixed to the pin, for limiting vertical relative movement of the first and second connection devices apart from one another.

* * * * *